Feb. 17, 1925.
J. STEVENS
1,526,877
QUACK GRASS DIGGER AND CULTIVATOR
Filed March 12, 1923    2 Sheets-Sheet 2
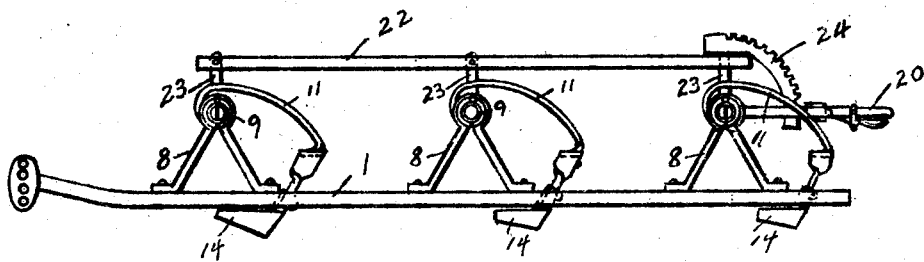
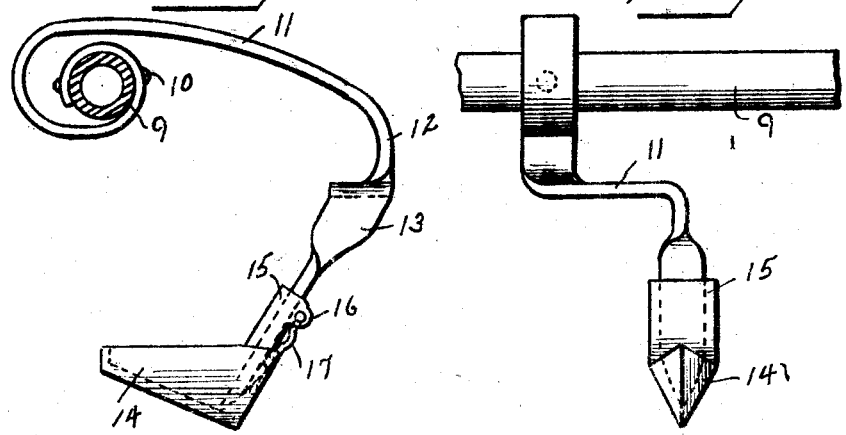
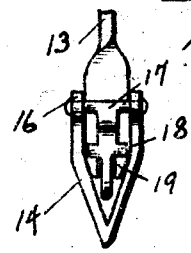
Inventor
Joseph Stevens Patented Feb. 17, 1925.

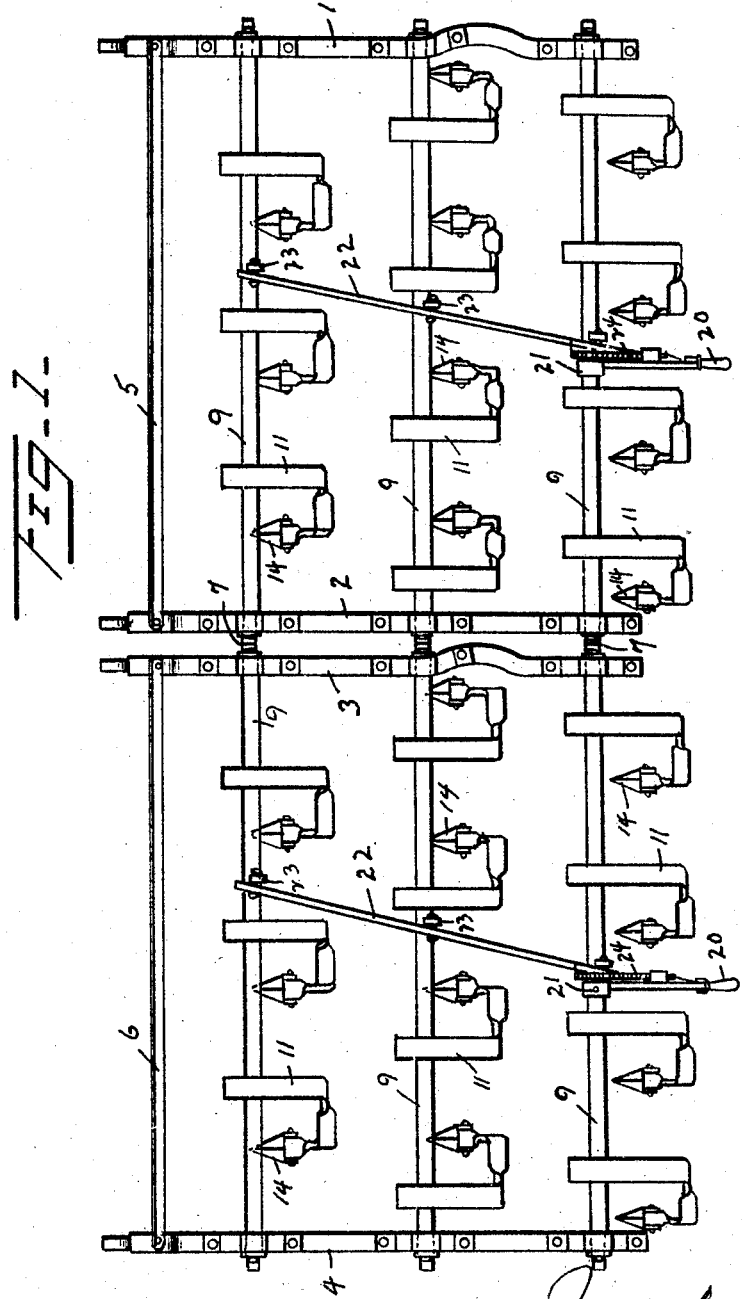

1,526,877

UNITED STATES PATENT OFFICE.

JOSEPH STEVENS, OF VALLEY CITY, NORTH DAKOTA.

QUACK-GRASS DIGGER AND CULTIVATOR.

Application filed March 12, 1923. Serial No. 624,543.

*To all whom it may concern:*

Be it known that I, JOSEPH STEVENS, a citizen of the United States, residing at Valley City, in the county of Barnes and State of North Dakota, have invented certain new and useful Improvements in a Quack-Grass Digger and Cultivator, of which the following is a specification.

This invention has particular relation to that class of cultivators or quack grass diggers constructed of two hinged or pivotally connected sections adapted to be folded up for transportation, each section being constructed of a series of metal shafts each of which is independently mounted in a separate bearing at each end, the said bearings being supported on runners and each of the horizontal metal shafts provided with a series of spring teeth, as will be more fully hereinafter described.

The prime object of this invention is to provide a cultivator particularly adapted for digging quack grass or cutting the roots of the grass so as to destroy same.

A further object of my invention is to provide each of the spring teeth with a removable cutting blade, so that in case one of the blades should become broken or when it is desired to sharpen the blades, same can be easily removed from the ends of the spring teeth.

A still further object of my invention is to provide a cultivator of the above indicated character, which is adapted to be mounted on runners so that the same can be easily transported to and from a field and each of the hinged sections carries means, whereby the adjusting of the spring teeth and cutting blades may be regulated into the ground.

An additional object of the invention is to provide a machine of the above indicated character, which is simple in construction and operation, durable, efficient for the purpose intended, and one that can be cheaply manufactured and placed on the market.

These and like objects of the invention will be better understood as the description follows and as is specifically pointed out in the appended claims.

Referring to the accompanying drawings which form a part of this specification and which clearly illustrate the construction of my improved cultivator, Figure 1 is a plan view of a cultivator constructed in accordance with my invention.

Figure 2 is a side view of same.

Figure 3 is an enlarged side elevation of one of the spring teeth, showing a cutting blade applied to the end thereof.

Figure 4 is an enlarged fragmentary plan view of one of the spring teeth showing a cutting blade applied thereto, and Figure 5 is an enlarged detail view of one end of one of the spring teeth showing means for securing the cutting blade thereon.

Referring to the accompanying drawing in detail, like characters will be used to designate like parts in the different views.

In the drawing, the numerals 1, 2, 3, and 4 indicate runners on which the horizontal shafts and spring teeth are supported. The runners 1 and 2 are connected by a crossbar 5, while runners 3 and 4 are connected by a crossbar 6. The inner sides of the runners 2 and 3 are adapted to be connected in any suitable manner as at 7. Supported on each of the runners 1, 2, 3, and 4 at spaced intervals are a series of V-shaped supporting brackets as indicated by the numeral 8. Supported for rotary movement in the V-shaped brackets on the runners 1, 2, 3, and 4 are shafts 9. The shafts 9 are constructed in a solid piece or same can be formed with a hollow center. Secured to each of the shafts as at 10 is a series of spring teeth 11, the spring teeth being positioned on the shafts in staggered relation, the object of which will be better understood as the description follows. Each of the spring teeth 11 after being securely fastened in loops around its respective shaft, extends towards the rear of the machine and is then bent downwardly as indicated by the numeral 12, after which the spring is twisted as at 13 to position the broad surface of the free end of each of the springs to the front of the machine, the free end of the spring also being on an incline as clearly indicated in Figures 2 and 3.

A cutting blade 14 having a recessed shank 15 is provided for the free end of each of the spring teeth 11. The shank 15 is formed adjacent the upper end of same with oppositely disposed lugs 16 in which is pivotally supported a locking lever 17. The lever 17 is formed with a T-shaped end 18 that is adapted to engage and rest on shoulders 19 formed on the back of the free end of each of the spring teeth 11 so that the cutting blades 14 are securely held on the free ends of the springs. In case it be desired to remove the cutting blades in order to sharpen or replace a broken one, it is only necessary to disengage the levers 17 from the shoulders 19.

When moving the cultivator to and from the field or any other time when it is not desired to use the cutting blades, the same are moved upwardly and to a plane above the runners by means of an operating lever 20 which is secured to one of the shafts 9 as at 21 and the operating rod 22 which is connected of each of the other shafts of the machine by a link 23. A quadrant 24 is located adjacent the lever 20 so that the cutting blades can be locked in any adjusted position.

In view of the foregoing description of my invention taken in connection with the accompanying drawings, it is thought that any further explanation as to the construction, operation, and objects of the invention is unnecessary.

While I have shown and described the preferred form of my invention, I realize the various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a cultivator, a frame, a series of shafts rotatably supported on said frame, a series of spring teeth secured to each of said rotatable shafts, a removable cutting blade provided for attachment to each of the spring teeth, a pivoted lever attached to each cutting blade adapted to engage the free ends of the spring teeth to secure the cutting blade thereto, and means for adjusting the depth of the cutting blades into the ground.

2. In a harrow, the combination with a series of runners, a series of shafts rotatably supported on said runners, a series of spring teeth secured to each of said rotatable shafts, shoulders formed on the free ends of the spring teeth, a removable cutting blade provided for the free end of each of said spring teeth, means carried by each of said cutting blades for engagement with said shoulders formed on said spring teeth for locking said cutting blades upon the free end of each of the spring teeth, and means connecting each of said rotatable shafts for operation of said shafts to regulate the depth of the cutting blades into the ground.

In testimony whereof, I have affixed my signature in the presence of two witnesses.

JOSEPH STEVENS.

Witnesses:
V. E. MIKKELSON,
ROSING E. GLIMME.